Figure 1:
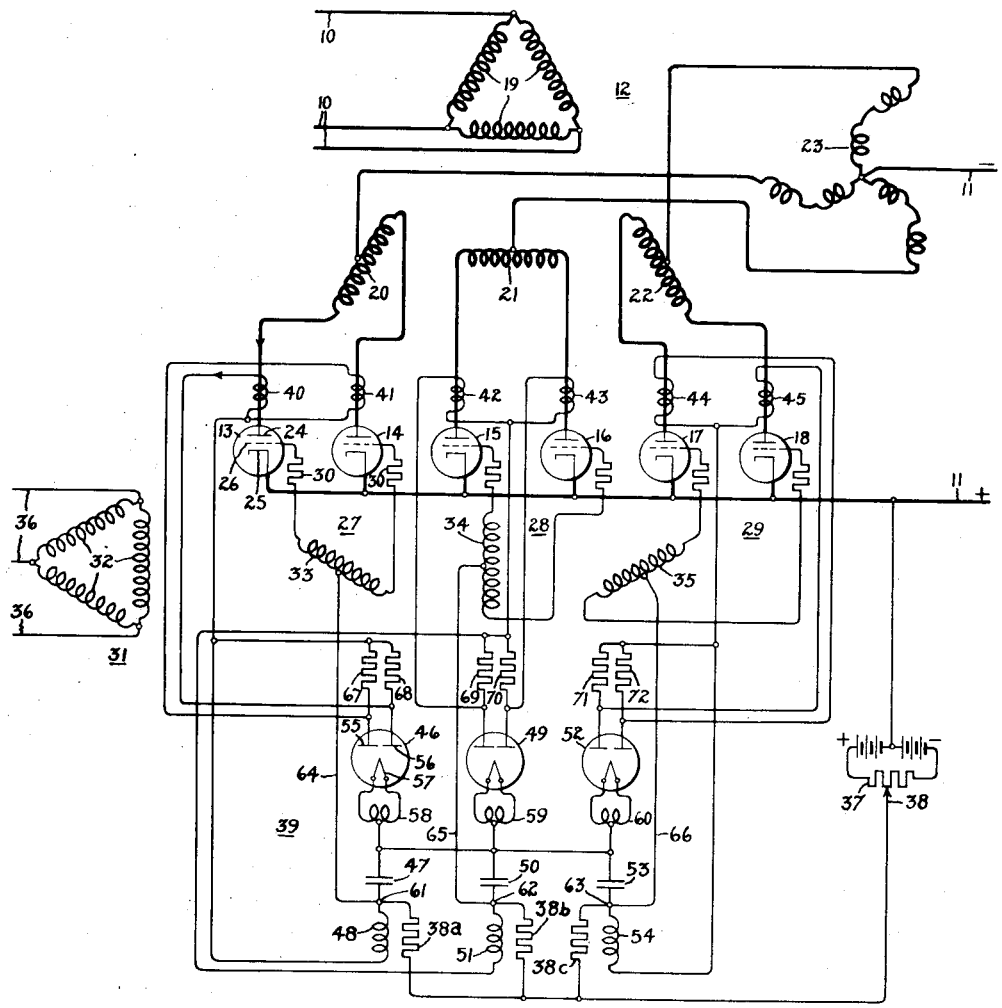

May 27, 1941.  E. E. MOYER ET AL  2,243,572

ELECTRIC VALVE CONVERTING SYSTEM

Filed April 27, 1940

Inventor:
Elmo E. Moyer,
by Harry E. Dunham
His Attorney.

Patented May 27, 1941

2,243,572

UNITED STATES PATENT OFFICE 2,243,572

ELECTRIC VALVE CONVERTING SYSTEM

Elmo E. Moyer, Scotia, N. Y., assignor to General Electric Company, a corporation of New York Application April 27, 1940, Serial No. 332,028

6 Claims. (Cl. 175—363)

My invention relates to electric valve converting systems wherein power is interchanged between two circuits through means comprising an electric discharge apparatus, and more specifically to an arrangement for compensating or preventing unbalance between the currents flowing in such an electric valve converting system.

This application is a continuation-in-part of my application Serial No. 295,341, filed September 16, 1939, and assigned to the same assignee as the present application.

Unbalancing difficulties due to various causes have been encountered in electric valve converting systems. Hence it is desirable to provide a current balancing means for electric valve converting systems such that the unbalance does not compound with current. In a copending application of Elmo E. Moyer, Lysle W. Morton and August Schmidt, Jr., Serial No. 295,342, filed September 16, 1939 and assigned to the assignee of the present application, there is disclosed and broadly claimed a current balancing means for continuously maintaining a balance between the currents flowing from a pair of secondary windings of the main power transformer of an electric valve converting apparatus. However, it is sometimes desirable to balance the currents flowing from a plurality of secondary windings in an electric valve converting apparatus where there are more than two windings between which the currents flowing therefrom are to be balanced.

It is an object of my invention, therefore, to provide a new and improved electric valve converting apparatus.

It is another object of my invention to provide an electric valve converting apparatus wherein currents flowing from at least three secondary transformer windings are prevented from becoming unbalanced.

It is a further object of my invention to provide an electric valve converting apparatus wherein any unbalance between the currents flowing from at least three secondary windings of an electric valve converting apparatus transformer causes an advance in the phase of the grid excitation of the discharge valves associated with those secondary transformer windings carrying less than their share of current in order to restore balanced current conditions.

In accordance with the illustrated embodiment of my invention I provide an electric valve converting apparatus for transmitting energy from a three-phase alternating current circuit to a direct current circuit through a triple biphase rectifier circuit including a main power transformer and a plurality of electric discharge valves. In order to balance the currents between the three secondary windings of the main transformer, current transformers are provided for each anode lead to the electric discharge valves to indicate the currents flowing from the secondary windings. By means of suitable rectifier valves direct current potentials proportional to the average currents flowing from each of the secondary windings are obtained and by means of a network arrangement are compared with one another. If any unbalance exists a direct current bias potential of such magnitude and polarity is obtained as to shift the phase of the grid excitation of the electric discharge valves so as to restore balanced current conditions.

The novel features which I believe to be characteristic of my invention are set forth with particularity in the appended claims. My invention itself, however, will best be understood by reference to the following description taken in connection with the accompanying drawing in which Fig. 1 diagrammatically represents an embodiment of my invention, and Fig. 2 is a schematic diagram to aid in the understanding of the operation of the arrangement illustrated in Fig. 1.

Figure 2:
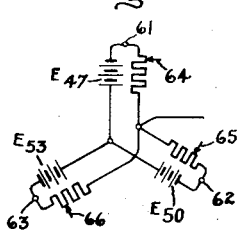

Referring now to Fig. 1 of the drawing, I have illustrated therein a system embodying my invention for transmitting energy from a polyphase alternating current supply circuit 10 to a direct current load circuit 11. An electric valve translating apparatus including a transformer 12 and a plurality of electric discharge valves 13 to 18, inclusive, are arranged to transmit energy between the supply and load circuits 10 and 11, respectively. The transformer 12 may comprise a primary winding 19 and three groups of secondary windings 20, 21 and 22, electrically displaced from one another and associated with the respective phases of the primary winding 19. In the specific embodiment shown, the transformer 12 and electric discharge valves 13 to 18 are arranged in what is commonly known as a "triple biphase" circuit. The midpoints of secondary windings 20, 21 and 22 are interconnected by a zigzag wound interphase transformer winding 23, the neutral of which is connected to one side of the direct current circuit 11. If the interphase transformer 23 is wound on three single phase cores it is preferably arranged in zigzag Y-connected relationship in order to eliminate any direct current component of flux. The end terminals of the secondary windings 20, 21 and 22 are connected to one of the electrodes of groups of electric discharge valves 13 14, 15 16, and 17 18, respectively. The electric discharge valves 13 to 18 are preferably of the type employing an ionizable medium such as a gas or a vapor and each comprises an anode 24, a cathode 25, and a control electrode or grid 26. Although I have illustrated electric discharge valves 13 to 18 as each comprising a plurality of electrodes mounted within an envelope containing an ionizable medium, it will be understood by those skilled in the art that electric discharge valves of the multi-anode, single-cathode type could equally well be used. The cathodes 25 of each of the electric discharge valves 13 to 18 are interconnected with the positive side of direct current circuit 11. Each pair of electric discharge valves 13 14, 15 16, and 17 18, is provided with an excitation circuit 27, 28 and 29, respectively, for energizing the respective control electrodes 26 thereof with suitable potentials to properly control the conductivity of the electric discharge valves. Each of the excitation circuits includes a pair of resistors 30 for limiting the grid current which may flow through the respective electric discharge valves. In order to impress on control electrode or grids 26 of electric discharge valves 13 to 18 alternating voltages, preferably having a lagging phase displacement relative to the anode-cathode voltages of these valves, I employ a grid transformer 31 having a three-phase primary winding 32 and three secondary windings 33, 34 and 35 electrically displaced from one another. The primary winding 32 of grid transformer 31 may be energized with alternating potential from any suitable supply 36 which has a fixed phase relation relative to the anode supply as for example, from alternating current supply circuit 10. The primary winding 32 of grid transformer 31 has, for simplicity of illustration, been drawn as orientated in phase 90 electrical degrees with respect to the primary winding of main power transformer 12 in order to indicate a 90-degree lagging phase displacement of the grid potentials relative to the anode potentials. It will be understood by those skilled in the art, however, that this lagging phase displacement, which is preferably between 45 and 90 electrical degrees, may be obtained by zigzagging the secondary windings of the grid transformer 31 or by the use of phase shifting transformers. With the alternating grid potentials of the electric discharge valves 13 to 18 lagging the anode-cathode potentials of these discharge valves the bias shift method of grid control as described and claimed in United States Letters Patent 1,654,987, granted January 3, 1928, upon an application of Albert H. Mittag, may suitably be employed. The secondary windings 33, 34 and 35 are connected in excitation circuits 27, 28 and 29, respectively, associated with pairs of electric discharge valves 13 14, 15 16, and 17 18. By impressing a direct current bias upon the mid-terminals of secondary windings 33, 34 and 35 of grid transformer 29 a shift in the phase of the grid potentials of electric discharge valves 13 to 18 relative to the anode-cathode voltages of these valves occurs and in this manner the instant in the anode voltage wave at which the electric discharge valves are rendered conductive is advanced or retarded depending upon whether the bias is made more or less positive or negative. It will be understood by those skilled in the art that in the arrangement described above a positive direct current bias impressed upon the mid-terminals of the secondary windings 33, 34 and 35 of grid transformer 31 will advance the phase of the grid excitation of electric discharge valves 13 to 18 and cause them to become conductive at an earlier time in each cycle of anode voltage. Conversely, a negative bias will retard the phase excitation relative to the anode-cathode voltage and render electric discharge valves 13 to 18 conductive at a later point in each cycle of anode voltage. In order to obtain this direct current bias to advance or retard the grid excitation of electric discharge valves 13 to 18, inclusive, I provide a regulator, such as a voltage divider 37, the moving arm 38 of which is connected through resistors 38a, 38b and 38c to the mid-terminals of secondary windings 33, 34 and 35 respectively of grid transformer 31. The function of these resistors in accordance with the present invention will be explained in detail at a later point in the specification. The other terminal of voltage divider 37 is connected to the cathodes of electric discharge valves 13 to 18, inclusive. The direct current bias potential obtained from voltage divider 37 is impressed upon the mid-terminals of secondary windings 33, 34 and 35 of grid transformer 31 and if increased in the positive direction will cause the electric valve converting apparatus to have an increased output while if increased in the negative direction it will decrease the output of the electric valve converting apparatus. A change in the position of moving arm 38 will affect alike the phase of the grid potentials of all the electric discharge valves 13 to 18. It will of course be understood by those skilled in the art that voltage divider 37 can readily be adapted to automatic regulation. For example, the direct current bias obtained from voltage divider 37 might be obtained from a suitable voltage regulator which would respond to the output voltage of the electric valve converting apparatus or from some other suitable signal. Furthermore, in the arrangement shown moving arm 38 of voltage divider 37 might be directly controlled in response to the voltage of direct current circuit 11 whereby voltage regulation of this circuit might be obtained.

Although I have described the electric valve converting apparatus as of the triple biphase type having three secondary transformer windings, it will be understood by those skilled in the art that any electric valve converting apparatus having at least three secondary transformer windings for transmitting energy from an alternating current circuit to a direct current circuit may be utilized.

In order to prevent or compensate for unbalance in the currents flowing from secondary windings 20, 21 and 22 of main power transformer 12, I provide in accordance with my invention a current balance control means 39 by which to maintain a balance between the currents flowing from the respective secondary windings of the main power transformer 12. Accordingly, I provide a plurality of current transformers 40–45, inclusive, arranged so that each has its primary winding connected in series with one of the main anode leads of the electric discharge valves 13 to 18, respectively. These current transformers are used to aid in indicating the currents flowing through the respective anodes of electric discharge valves 13 to 18. The secondary outputs of current transformers 40 and 41, which are associated with the anode supply lines leading from secondary winding 20 of main power transformer 12, are rectified by means of double element thermionic rectifier 46 connected in series with capacitor 47 and smoothing reactor 48. By this arrangement there is produced a direct current potential across capacitor 47 responsive to the average current flowing through electric discharge valves 13 and 14. Similarly, the secondary outputs of current transformers 42 and 43 associated with the anode supply lines leading from the secondary winding 21 of transformer 12 are rectified by means of double element thermionic rectifier 49 and filtered by capacitor 50 and smoothing reactor 51 so that a direct current potential appears across capacitor 50 which is proportional to the average current carried by electric discharge valves 15 and 16. Also the secondary outputs of current transformers 44 and 45 which are associated with the anode supply lines leading from secondary winding 22 of main power transformer 12 are rectified by means of double element thermionic rectifier 52 and filtered by capacitor 53 and smoothing reactor 54 whereby a direct current potential appears across capacitor 53 which is proportional to the average currents flowing through electric discharge valves 17 and 18. Each of the thermionic rectifiers 46, 49 and 52 is provided with a pair of anodes 55 and 56 and a cathode 57 of the hot cathode type, the filament of which is suitably energized for heating purposes from filament transformers 58, 59 and 60, the secondary windings only of which are illustrated in Fig. 1. The primary windings (not shown) are energized from a suitable source of alternating current as is well understood by these skilled in the art. The midpoints of the secondary windings 58, 59 and 60 are connected together to provide a cathode line for the rectifiers 46, 49 and 52. By means of capacitors 47, 50 and 53 and smoothing reactors 48, 51 and 54, direct current potentials proportioned to the average rather than the peak currents caried by electric discharge valves 13 to 18 are obtained. The positive terminals of capacitors 47, 50 and 53 are connected together so that the direct current potentials responsive to the average currents flowing through electric discharge valves 13 14, 15 16 and 17 18, may be compared for control purposes. As long as the average currents flowing from secondary windings 20, 21 and 22 are equal the potentials appearing across capacitors 47, 50 and 53 will be equal and there will be no potential difference between the negative terminal 61 of capacitor 47 and the negative terminal 62 of capacitor 50 or the negative terminal 63 of capacitor 53, or between terminals 62 and 63. If, on the other hand, the currents flowing from transformer secondary winding 20 are greater than those flowing from transformer windings 21 and 22 the potential across capacitor 47 will be greater than the potential across capacitors 50 and 53 since these potentials are proportional to the average current flowing from the corresponding secondary winding of main power transformer 12. Since the positive terminals of capacitors 47, 50 and 53 are at the same potential, terminal 61 will have a potential more negative than terminals 62 and 63, respectively. In other words, capacitors 47, 50 and 53 form a star or Y-connected network with the negative terminals of the capacitor forming the end terminals of the network. In order to utilize this difference in potential between terminals 61, 62 and 63, respectively, for maintaining predetermined balanced conditions betwen the currents flowing from transformer secondary windings 20, 21 and 22, I provide the resistors 38a, 38b and 38c which are also connected in star or Y relationship with the end terminals thereof connected to the terminals 61, 62 and 63, and with the common terminal connected to the terminal 38 of the potentiometer regulator. As shown in Fig. 1 the terminals 61, 62 and 63 are connected to the midpoints of the grid transformer secondaries 33, 34 and 35, respectively, by conductors 64, 65 and 66. With this arrangement it is apparent that the unidirectional bias applies to the grid transformer secondaries includes the potential of the potentiometer regulator and also the potential across one of the resistors 38a, 38b and 38c. In order to make initial circuit adjustments for balanced conditions it is desirable to connect the conductors 64, 65 and 66 to the resistors 38a, 38b and 38c by a slidable connection instead of at the end terminals 61, 62 and 63, as illustrated in Fig. 1. This arrangement is shown in Fig. 2 which will be referred to in more detail during the explanation of the operation of the system of Fig. 1.

The polarities of the current transformer windings as indicated by the arrowheads associated with current transformer 40 are such that when current flows through the main electric discharge valves 13 to 18 in a direction from anode to cathode, respectively, the secondary current flows from anode to cathode of thermionic rectifiers 46, 49 and 52. Because of the fact that an excessively high inverse voltage appears across current transformers 40 to 45, respectively, at the time when the current ceases to flow in electric discharge valves 13 to 18, I have provided resistances 67 to 72 connected across the secondary windings of current transformers 40 to 45, respectively so as to minimize this high induced voltage which would otherwise appear across the secondary windings 40 to 45. These resistances 67 to 72 also tend to minimize the high frequency oscillations that appear across the secondary windings of the current transformers. In the interest of more faithful metering of the currents flowing through transformer secondary windings 20 to 22, respectively, it will be understood by those skilled in the art that resistances 67 to 72 may be replaced by suitable electric discharge valves connected in such a manner as to short-circuit the current transformer secondary windings at the time this high negative inverse voltage appears. When resistances 67 to 72 are used the ohmic value of these resistances must be considered in order to calibrate the current balancing control circuit 39 to compensate for the current flowing through the resistors 67 to 72, respectively.

In order to understand the operation of the embodiment of my invention illustrated in Fig. 1, reference may be had to Fig. 2 which schematically represents the network made up of resistors 38a, 38b and 38c and unidirectional voltage sources $E_{47}$, $E_{50}$ and $E_{53}$ which have been substituted for the capacitors 47, 50 and 53 of Fig. 1. When the system is operating with equal or balanced current flowing in the secondary windings 20, 21 and 22 of the main power transformer 12, the capacitors 47, 50 and 53 are charged to the same extent and the voltages $E_{47}$, $E_{50}$ and $E_{53}$ are identical. Under these conditions no direct current potentials will appear between terminals 61, 62 and 63 and the only bias potentials impressed upon the control electrodes 26 of electric discharge valves 13 to 18 are those obtained from the potentiometer regulator 37. If, however, for some reason the average current through electric discharge valves 13 and 14 the anodes of which are connected with secondary transformer winding 20, is greater than the average current flowing through electric discharge valves 15 and 16 or 17 and 18 the voltage E47 across capacitor 47 will be greater than the voltages E50 and E53 shown on the schematic diagram of Fig. 2. The potentials between terminal 61 and terminals 62 and 63 will cause current to flow through resistors 38a, 38b and 38c in such a direction that terminal 61 will be negative with respect to the neutral terminal connected to slider 38 and terminals 62 and 63 will be positive with respect to slider 38. In other words, a positive bias will be impressed upon the midpoint of grid transformer secondary windings 34 and 35, while a negative bias potential will be impressed upon the midterminal of the secondary grid transformer 33. The positive bias potentials which are impressed upon the grid 26 of electric discharge valves 15, 16, 17 and 18 advance the phase of the grid excitation of the valves relative to the anode-cathode potentials thereof so as to cause them to carry a larger amount of current. The excitation of electric discharge valves 13 and 14, however, is retarded by the negative bias applied to the midtap of grid transformer 33 because of the negative potential of terminal 61 so that these valves tend to carry less current and in this manner current balance is restored. In the explanation just given it was assumed that the average currents transmitted by the valves associated with secondary windings 21 and 22, remain equal but it is apparent that the balancing arrangement of the present invention functions equally well if all of the secondary windings tend to carry different amounts of current. The effect is always to alter the bias of the valves carrying more than their proportionate share of the load in such a way as to retard the excitation of the control electrodes associated therewith and conversely for the valves carrying less than their share of the load.

Although I have described a current balancing means as applied to a triple biphase rectifier circuit, it will be understood by those skilled in the art that this current balancing control may be applied equally well to any electric valve converting apparatus having at least three groups of windings having electric discharge valves associated therewith to maintain a balance between the currents flowing in the windings.

While I have shown and described a particular embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination a supply circuit, a load circuit, electric translating apparatus connected between said circuits and including a transformer and a plurality of electric discharge valves each including a control electrode, said transformer having a primary winding and at least three secondary windings, and means for maintaining balanced conditions between the currents flowing in said secondary transformer windings including means responsive to the currents flowing in each of said secondary windings for deriving resultant potentials dependent upon the relative magnitudes of said currents and impressing said potentials on said control electrodes to vary the conductivities of the electric discharge valves associated with each of said secondary transformer windings in such a manner as to restore a current balance.

2. In an electric valve converting apparatus, an alternating current circuit, a direct current circuit, electric translating apparatus interconnecting said circuits including a plurality of inductive windings and a group of electric discharge valves associated with each of said windings, each of said valves including a control electrode, means for maintaining a balance between the current transmitted by each of said groups of electric discharge valves including means for deriving a direct current potential proportional to the current transmitted by each of said groups of valves, and means including a star-connected network of impedance elements for comparing said direct current potentials and impressing on the control electrodes of said electric discharge valves potentials tending to vary the conductivities of said valves in a manner to restore current balance.

3. In an electric valve converting apparatus, a direct current circuit, an alternating current circuit, electric translating apparatus interconnecting said circuits including at least three inductive windings and a plurality of electric discharge valves associated with each of said windings, each of said valves including a control electrode, and means for maintaining a balance between the current transmitted by the valves associated with each of said windings including means for deriving a potential dependent upon the current transmitted by the valves associated with each of said windings, and a network of impedance elements for comparing said direct current potentials and impressing a bias on the control electrodes of the valves associated with each of said inductive windings tending to vary the conductivities of the valves in a direction to restore current balance.

4. In an electric valve converting apparatus, an alternating current circuit, a direct current circuit, electric translating apparatus interconnecting said circuits and including at least there inductive windings and a plurality of electric discharge valves associated with each of said windings, each of said discharge valves including a control electrode, means for maintaining a balance between the current transmitted by the valves associated with each of said inductive windings including a star-connected network of capacitors, means for impressing on each of said capacitors a direct current potential proportional to the current transmitted by the valves associated with one of said windings, and means for comparing the potentials of said capacitors and impressing a control potential on each of said control electrodes dependent upon the inequalities in the voltage impressed on said capacitors for varying the conductivities of the valves associated with each of said inductive windings in a direction to restore current balance.

5. In an electric valve converting apparatus an alternating current supply circuit, a direct current load circuit, electric translating apparatus connected between said circuits and including a transformer and a plurality of electric discharge valves, said transformer being provided with a primary winding and at least three secondary windings, said electric valves being arranged in groups, each group being associated with one of said secondary transformer windings, an excitation circuit for each of said groups of discharge valves, means for maintaining balanced conditions between the currents flowing in said secondary transformer windings, said last mentioned means comprising means for producing direct current potentials proportional to the average currents flowing in each of said secondary transformer windings, and means for impressing any differences between said direct current potentials on the excitation circuits of all of the groups of electric discharge valves to vary the conductivities thereof to maintain a predetermined division of current among said transformer secondary windings.

6. In an electric valve converting apparatus an alternating current supply circuit, a load circuit, electric translating apparatus connected between said circuits and including a transformer and a plurality of electric discharge valves, said transformer having a primary winding and a plurality of secondary windings, an excitation circuit for said electric discharge valves, means for preventing unbalance between the currents flowing from said secondary transformer windings including a plurality of current transformers and rectifiers associated therewith for producing direct current potentials responsive to the currents flowing from each of said transformer secondary windings, a star-connected network of impedance elements for comparing said direct current potentials so as to obtain resultant bias potentials if any unbalance exists, and means for impressing such bias potentials upon the excitation circuits of said electric discharge valves in order to restore balanced current conditions.

ELMO E. MOYER.

CERTIFICATE OF CORRECTION.

Patent No. 2,243,572. May 27, 1941.

ELMO E. MOYER.

It is hereby certified that error appears in the above numbered patent requiring correction as follows: In the heading to the drawing, name of inventor, for "E. E. MOYER ET AL" read --E. E. MOYER--; page 3, first column, line 40, for "caried" read --carried--; line 73, for "betwen" read --between--; and second column, line 10, for "applies" read --applied--; page 4, second column, line 47, claim 4, for "there" read --three--; and that the said Letters Patent should be read with this correction therein that the same may conform to the record of the case in the Patent Office.

Signed and sealed this 15th day of July, A. D. 1941.

(Seal)
Henry Van Arsdale,
Acting Commissioner of Patents.